(12) United States Patent
Mueller et al.

(10) Patent No.: US 7,354,020 B2
(45) Date of Patent: Apr. 8, 2008

(54) SYSTEM FOR USE OF EXTERNAL SECONDARY PAYLOADS

(75) Inventors: George E. Mueller, Kirkland, WA (US); Gary Lai, Seattle, WA (US); Thomas C. Taylor, Las Cruces, NM (US)

(73) Assignee: Kistler Aerospace Corporation, Kirkland, WA (US)

( * ) Notice: Subject to any disclaimer, the term of this patent is extended or adjusted under 35 U.S.C. 154(b) by 0 days.

(21) Appl. No.: 10/698,261

(22) Filed: Oct. 31, 2003

(65) Prior Publication Data
US 2004/0124312 A1 Jul. 1, 2004

Related U.S. Application Data

(60) Provisional application No. 60/424,159, filed on Nov. 6, 2002.

(51) Int. Cl.
*B64G 1/22* (2006.01)
(52) U.S. Cl. .................................... 244/158.1
(58) Field of Classification Search ................ 244/160, 244/158.1, 110 B, 158.9, 159.1; 60/242
See application file for complete search history.

(56) References Cited

U.S. PATENT DOCUMENTS

| | | | | |
|---|---|---|---|---|
| 3,152,548 A | * | 10/1964 | Schwartz | 244/159.1 |
| 3,416,750 A | * | 12/1968 | Young | 244/162 |
| 4,265,416 A | | 5/1981 | Jackson et al. | |
| 4,338,368 A | * | 7/1982 | Lovelace et al. | 428/212 |
| 4,650,139 A | | 3/1987 | Taylor et al. | |
| 4,771,971 A | * | 9/1988 | Ludwig et al. | 244/158 R |
| 4,790,499 A | | 12/1988 | Taylor et al. | |
| 4,796,839 A | | 1/1989 | Davis | |
| 4,804,571 A | * | 2/1989 | Jouffreau | 428/77 |
| 4,884,770 A | | 12/1989 | Martin | |
| 5,020,743 A | * | 6/1991 | von Bun et al. | 244/159 |
| 5,133,517 A | | 7/1992 | Ware | |
| H1133 H | * | 2/1993 | Bridges et al. | 244/110 C |
| 5,402,965 A | * | 4/1995 | Cervisi et al. | 244/2 |
| 5,568,901 A | | 10/1996 | Stiennon | |
| 5,927,653 A | * | 7/1999 | Mueller et al. | 244/172 |
| 6,119,985 A | * | 9/2000 | Clapp et al. | 244/172 |
| 6,467,731 B1 | * | 10/2002 | Harris et al. | 244/160 |

OTHER PUBLICATIONS

"K-1 Vehicle TA-10 Flight Experiments Design and Requirements Document." Kistler Document No. 21-Report-N-001, Revision B, Sep. 20, 2001, 33 pp.

* cited by examiner

*Primary Examiner*—Tien Dinh
(74) *Attorney, Agent, or Firm*—Michael J. Donohue; Davis Wright Tremaine LLP (57) ABSTRACT

An experiment system with six different re-entry experiment locations for testing high temperature re-entry materials, creating new thermal protection systems, proving innovative new concepts for spacecraft exterior surfaces and the incremental development of next generation aerospace materials. A commercial transportation system to and from orbit provides a 24-hour return cycle for the experiments on a surface actually re-entering the earth's atmosphere. Now using existing doors, hatches and other points on the reusable launch vehicle's exterior, the actual re-entry environment is experienced by test specimens with quick turn around for a wide variety of different re-entry temperatures ranges for broad testing and development purposes. The reusable launch vehicle launches, remains in orbit for 24 hours and returns to provide an actual test environment for the exterior experiment system.

16 Claims, 7 Drawing Sheets

SYSTEM FOR USE OF EXTERNAL SECONDARY PAYLOADS

CROSS-REFERENCE TO RELATED APPLICATIONS

This utility patent application claims the benefit of the filing of U.S. Provisional Patent Application No. 60/424,159, entitled "Commercial External Re-Entry Testing from Orbit," filed on Nov. 6, 2002 and the specification thereof is incorporated herein by reference.

This utility patent application also claims the benefit of the filing of U.S. Disclosure Document No. 521688, entitled "Commercial External Re-entry Testing from Orbit (IDF063) and Secondary Internal Payloads (IDF039)," filed on Nov. 15, 2002 and the specification thereof is incorporated herein by reference.

NO GOVERNMENT RIGHTS

No government funding, no government support or government contract or clause is related to this invention.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to transporting external test experiments to and from orbit on the exterior of a reusable launch vehicle. More particularly, the present invention relates generally to external vehicle experiments, integration, transport to orbit, exposure in orbit, exposure to the external re-entry environment from orbit including instrumentation and testing apparatus and the return of various support hardware and experiment sample services used on reusable space transportation vehicles.

2. Description of the Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

The transportation of cargo to space is expensive. The secondary payload hardware has mass and minimum volume. Transporting the internal secondary payload hardware to and from orbit in an affordable manner is a goal consistent with life cycle costs and efficient logistics operations. The problem is the cost of the individual operations required to transport cargo to orbit. The part of the transportation operation can be addressed by the emerging reusable launch vehicles. Kistler Aerospace's secondary payload hardware research and development has proposed various additional aerospace structures and opened a new area of technology and commercial secondary payload hardware accommodation. Secondary payload hardware structures are a refined technology within the aerospace community. Unmanned activities in space are less expensive than manned activities. The unmanned aerospace reusable launch vehicle (RLV) can provide the secondary payload hardware technologies to smooth this process.

The traditional approach to manifesting of space launch systems has been hardware intensive, safety driven and long duration scheduling activities. The emerging commercial technologies point another way and attempt to be sensitive to commercial customer's launch on demand requirements.

Many previous space launch patents in prior art discuss reusable features, but none talk about external payloads designed to permit the testing of the materials required. The heating on the surfaces of the reusable launch vehicle are significant and require testing to develop a reliable reusable material and the testing environments for development. A typical simulation procedure requires several wind and arc jet wind tunnels to simulate, on the earth's surface, part of the re-entry environment experienced in an actual orbital re-entry.

U.S. Pat. No. 4,884,770 to Martin, issued on Dec. 5, 1989, describes a earth to orbit turbojet vehicle, but no mention of testing external surfaces on the exterior. U.S. Pat. No. 4,796,839 to Davis, issued on Jan. 10, 1989, describes an earth to orbit vehicle with recovery aspects, but no mention of testing external surfaces on the exterior. U.S. Pat. No. 4,265,416 to Jackson of NASA, issued on May 5, 19819, describes a earth to orbit reusable vehicles, but no mention of testing external surfaces on the exterior. U.S. Pat. No. 5,568,901 to Stiennon, issued on Oct. 29, 1996, describes a two stage earth to orbit reusable vehicle, but no mention of testing external surfaces on the exterior surfaces. Even U.S. Pat. No. 4,802,639 to Hardy, issued on Dec. 5, 1989, describes an earth to orbit turbojet vehicle, but no mention of testing external surfaces on the exterior.

U.S. Pat. No. 5,133,517 to Ware, issued on Jul. 28, 1992, uses an access door on the external tank, but fails to associate it to any exterior tests designed to provide samples for thermal protection system (TPS) analysis in the patent.

U.S. Pat. No. 4,650,139 to Taylor, issued on Mar. 17, 1987, attempts to alter the TPS on a partly reusable space launch vehicle, but enhance the aerodynamic flow by changing the re-attach point and injecting fluids into the slip stream, but no mention of returning sample for analysis or removing samples from the vehicle after re-entry. U.S. Pat. No. 4,790,499 to Taylor, issued on Dec. 13, 1988, expands the original patent, but fails to return any external samples.

The exterior sample return from the external tank (ET) of the space shuttle has been studied by NASA and their manufacturers in the 1980's, but the sample return from the ET requires removal of the samples from the ET after it has been taken to orbit. This involves altering the space shuttle mission trajectory, the salvage of the ET in orbit, a space walk by an astronaut for removal of the TPS samples from the ET, the restowing of the samples aboard a reusable segment of the vehicle and the proper disposal of the ET, which involves significant additional effort and expense.

Project Re-Entry II: Returning samples from Earth orbit at www.gvsp.usra.edu steps around the issue, but discusses low-cost sample return missions and has held two workshops, but doesn't mention using the return capsule and a test article for future mission for exterior materials or future samples for development by analysis of re-entry materials. The Ariane vehicle by the European Space Agency creates an Ariane Re-entry Demonstrator (ARD) testbed to re-enter from earth orbit, but is separate hardware and appears to have no exterior re-entry samples in the literature or pictures. Again it is the microgravity that is the focus of ARD rather than the phased testing approach with incremental development advances in materials technology based on systematic analysis of re-entry sample materials from actual re-entry missions.

Even the Orbital Science Corporation Pegasus alludes to leading edge research into thermal protection systems on www.orbital.com and some of their technical papers and literature details missions for spaceplanes, but all seem to cost an entire mission instead of the full instrumentation tests with sample back for analysis in an incremental development manner. Prior art uncovered to date is not directly germane to the present invention.

The space station attempts to address the exposure of experiments to the space environment, see Brian Berger's article, "NASA Aims to Finish Express Pallet As Costs Stiffe Brazil's Plans," SPACENEWS Aug. 26, 2002, 1p, Springfield, Va., USA. The Express Pallet does not address either cycle through the atmosphere, however. Astrocourier (USA) addresses a similar commercial market, but also does not offer either cycle through the atmosphere, however.

Accordingly, it can be appreciated that there is a great need for a cost effective, reliable, efficient, and safe hardware systems using integrated technologies containing subsystems common with the reduced cost hardware solutions. The present invention provides this and other advantages, as will be apparent from the following detailed description and accompanying figures.

SUMMARY OF THE INVENTION

The techniques described herein comprise, in an exemplary embodiment, a system for introducing payloads into earth orbit. The system comprises a reusable orbital vehicle capable of being placed in earth orbit and having an outer skin surface. The vehicle has plurality of attachment positions located on the outer skin surface of the orbital vehicle. The system further comprises a first experimental package affixed to the orbital vehicle at a first one of the plurality of attachment positions wherein the first experimental package is exposed to the external atmosphere during launch and reentry phases of a space mission and is further exposed to the environment of space while in orbit.

In an alternative embodiment, the system may further comprise a second experimental package affixed to the orbital vehicle at a second one of the plurality of attachment positions such that the second experimental package is exposed to the external atmosphere during launch and reentry phases of the space mission and is further exposed to the environment of space while in orbit.

In one embodiment, the system further comprises an access panel on the outer skin surface of the reusable orbital vehicle wherein at least one of the plurality of attachment positions is located on the access panel. The access panels may be removable from the reusable orbital vehicle.

The experimental package may comprise a thermal protection system. In one embodiment, a carrier plate is configured for attachment at the first one of the plurality of attachment positions and further configured for attachment to the first experimental package wherein the carrier plate is intermediate the outer skin surface of the orbital vehicle and the first experimental package. Alternatively, the system may further comprise a thermal protection system affixed to the orbital vehicle to form the outer skin surface thereof. The thermal protection system at at least one of the plurality of attachment positions being configured for attachment to the first experimental package.

The plurality of attachment positions may be in a variety of different locations on the orbital vehicle. The orbital vehicle has an elongated shape with first and second ends and a rocket engine positioned proximate the second end. The first of the plurality of attachment positions is on the exterior skin of the orbital vehicle substantially at the first end. Alternatively, a first of the plurality of attachment positions may be on the exterior skin of the orbital vehicle forward of a midpoint between the first and second end. In yet another alternative embodiment, the first of the plurality of attachment positions may be on the exterior skin of the orbital vehicle rearward of a midpoint between the first and second end. In yet another alternative embodiment, the orbital vehicle also has an aft skirt proximate the second end wherein a first of the plurality of attachment positions is on an exterior skin portion of the aft skirt.

In yet another alternative embodiment, the orbital vehicle has an aft skirt and a protected attachment position on an interior portion of the aft skirt. The system may further comprise an aft skirt with an attachment member mounted to an interior portion of the aft skirt. In this embodiment, the attachment member may be rotatably mounted to the interior portion of the aft skirt.

A second experimental package may be coupled to the attachment member and, the system may further comprise a control system to control movement of the attachment member and thereby position a second experimental package outside the interior portion of the aft skirt.

In yet another embodiment, the system further comprises a sensor associated with the first experimental package, the sensor generating sensor data. The system may further comprise an experiment management unit electrically coupled to the orbital vehicle and electrically coupled to the sensor wherein the experiment management unit receives and stores the generated sensor data. The system may also be used with an avionics data bus on the orbital vehicle used to monitor operation of the orbital vehicle. In this embodiment, the experiment management unit is coupled to the avionics data bus to monitor the operation of the orbital vehicle and to store data related to the operation of the orbital vehicle in association with the generated sensor data. The sensor may be used with the first experimental package wherein the first experimental package comprises a thermal protection system.

In yet another embodiment, a system for introducing payloads into earth orbit comprises a reusable orbital vehicle having an elongated body portion with first and second ends with a rocket engine positioned proximate the second end of the orbital vehicle and an aft skirt coupled to the body portion proximate the second end and extending circumferentially around the rocket engine. The system further comprises an attachment member mounted to an interior portion of the aft skirt and configured to receive an experiment.

In one embodiment, the attachment member is rotatably mounted to the interior portion of the aft skirt. In another embodiment, the attachment member is movably mounted to the interior portion of the aft skirt and the system further comprises a control system to control movement of the attachment member to move the attachment member and thereby position the experiment outside the interior portion of the aft skirt.

In one embodiment, the experiment may be an experimental control surface. In this embodiment, the control system provides steering control of the attachment to thereby steer the experiment while positioned outside the interior portion of the aft skirt. In this embodiment, the system may also comprise a sensor associated with the experiment to generate sensor data and a data storage unit to store the generated sensor data.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

In contrast to high cost current technology, the present invention uses the emerging technologies to create hardware and procedures of a commercial nature. These secondary payload hardware systems and environments that start the process of lowering the cost of space activities by creating a commercial system using space for commercial gain and supported by affordable transportation.

As will be discussed in detail below, the exterior secondary payload hardware invention provides support for the exterior experiments and other experiment accommodation hardware and eventually integrating/delivering/servicing experiment payloads to low earth in a cost effective manner and return through the re-entry environment. The hardware of the invention is a reusable launch vehicle (RLV) supporting a series of exterior secondary payloads using hardware solutions to create a commercial service enterprise providing access to the ascent and re-entry environments for customers.

The accommodation of external secondary payload hardware on the launch vehicles uses various methods to provide a commercial service to the customer. A primary advantage of the techniques described herein is to reduce costs. This advantage includes the cost effective combination of a reusable launch vehicle, with both the ascent and re-entry environment, an affordable subsystem hardware concept for the commercial attachment of external experiments, the processing of the experiments within the integration or refurbishment between flights, the use of the reusable launch vehicle's avionics, power, communications and other capabilities and other technologies to reduce the costs for testing.

The exterior secondary payload hardware on a reusable launch vehicle advantageously provides an opportunity for commonality with existing subsystems already used on the launch vehicle and/or secondary payload hardware providing cost effective common subsystems through commonality in design, procurement, testing and secondary payload hardware attachment.

The common ground handling techniques, launch on demand manifesting, technical maintenance, financing and ownership of the exterior secondary payload hardware, launch vehicle, and payloads all serve to reduce costs and increase efficiency to the point where commercialization is feasible.

Another advantage of the secondary payload hardware is an integrated design, flexible enough to be capable of accommodating, on an RLV, a number of different payloads from numerous organizations with varying requirements, different weights, different processing requirements, and varying financial needs. The RLV provides its vehicle capabilities as a testbed for the full cycle to and from orbit and ground services supporting the exterior secondary payload hardware payloads in orbit.

Within structured safety and aerodynamic limits, the invention includes the various exterior payloads with different shapes that can be attached to the exterior surface using adaptable structural interfaces. As will be described in greater detail below, the exterior secondary payload hardware placed in different locations on the host launch vehicle with the flexibility, common subsystems, multiple attachment locations and launch on demand capabilities of the exterior secondary payload hardware and RLV combination.

The exterior secondary payload hardware can be configured in various sized packages and placed as different sizes in both high and low heating areas on the host launch vehicle. This second stage of the RLV is cost effective, because it combines the advantages of a reusable launch vehicle including the ability to examine the materials used that is not available with expendable vehicles.

Another feature described herein includes the stowage of an experiment within the aft flare volume of the launch vehicle out of the slip stream. The mounting apparatus has a rotating arm to introduce this arm tip into the slip stream during the re-entry phase of the re-entry trajectory.

In a nominal mission, the exterior secondary payload hardware is mated with the customer's experiment. The launch vehicle powers the payload on the full transportation cycle. The current experimental timeline includes the full ascent exposure, 22 hours of the space environment in orbit and the re-entry environment to full landing.

The exterior secondary payload hardware relates to introducing a full service all in one testing environment, which can only be simulated on the Earth with a series of wind and arc jet tunnels to an existing customer base. The new interfaces and support structure technologies, reusable launch vehicle (RLV) technology and its use in the space environment of orbit offers a new avenue of testing that makes many expensive alternatives nearly obsolete. The present invention provides a more cost-effective integration, ascent transportation to orbit, 22 hour exposure in orbit and return through the re-entry environment. The customer system is capable of placing test samples and experiments into orbits beyond the capability of sounding rockets, sub-orbital air launch systems, arc jet/wind tunnels and other current development methods.

One example of a fully reusable launch vehicle is the Kistler Aerospace Reusable Launch Vehicle called the K-1. The present description illustrates the operation of the invention on the K-1 reusable launch vehicle. However, the present invention relates generally to the access to space ascent and re-entry environments plus hardware innovation and testing locations with supporting repeatable transportation cycles or missions, the transfer and attachment of payloads to a variety of space transportation vehicles for the research, testing and the exposure of experiments in orbital re-entry environments including the return of experiment samples to earth for analysis and profit.

The present invention hardware is capable of providing more than just the transportation service to orbit like all other expendable launch vehicles. The experiments, when carried to orbit and during re-entry from orbit, provide the services such as power, data recording, sensors, communications and different structural attachments using the existing Development Flight Instrumentation (DFI) System on the launch vehicle.

The development of thermal protection systems (TPS) for space launch vehicles requires a phased testing and development process of trial and error on various systems and materials that are tested and documented afterward. An expendable launch vehicle limits the analysis afterward, because the hardware and the exterior samples including the entire stage or vehicle are discarded in the launch process.

The K-1 is a reusable launch vehicle and offers the advantage of exposing the external experiments to the entire transportation cycle envelope and the opportunity to examine the experiment samples afterward. To obtain similar conditions from Mach zero to Mach 25, atmospheric pressures from 14.7 psi to zero and the thermal environments involved; required previous researchers and manufacturers to use a series of different wind tunnel and arc jet tunnels to attempt to duplicate the ascent, orbital and re-entry environments. This was time consuming, expensive, labor intensive and less effective than the present invention.

Experiment Accommodations

Ordinary expendable launch and re-entry vehicles have a variety of different environments on the exterior of the vehicle, but it generally requires two vehicles, one for launch and one for re-entry to provide the full testing environment. The reusable launch vehicle can provide the same environment on one reusable vehicle and repeat the identical experiment in both directions again on the next mission using a new test experiment.

The example K-1 vehicle can accommodate three basically different environment locations with different types of experiments in both directions of travel on the same vehicle. This is the subject of this patent application. Externally mounted experiments are mounted on fail-safe test panels and would include advanced materials and TPS experiments. Internally mounted experiment support hardware to support the exterior experiment is accommodated inside the reusable launch vehicle in a variety of locations on the vehicle. The third type of experiment is the replacement of an existing K-1 subsystem or component with one using advanced technology.

Externally Mounted Experiment Accommodations

The RLV can place experiments on the outside of the vehicle to demonstrate the operation of thermal protection systems and other exterior technologies in an actual launch, orbital, and reentry environment. While the space shuttle has a full transportation range of complete ascent and re-entry cycles on the same vehicle, it does not have the provisions for exterior test locations or the support hardware to support the testing or the provisions for supporting the experiments with power, communications and other services during the experiment phase. The reusable launch vehicle described herein provides exterior experiment locations in both directions.

The Kistler K-1 reusable launch vehicle (RLV) is one example of such a reusable launch vehicle. The K-1 RLV comprises a booster stage or launch assist platform (LAP) 58 (see FIG. 7) and an orbital vehicle (OV) 20 (see FIG. 1). Exterior experiments are mounted in Kistler supplied hardware of various sizes for use in various locations. The Kistler-supplied Experiment Containment hardware can also be used for government and commercial experiments. Experiments can be placed at locations on the OV nose, OV Mid-Body, and OV Aft Flare within regions of two different types of existing thermal protection system (TPS) on the Kistler vehicle. The repeatable experiments are designed to provide a standard mechanical and electrical interface for a wide variety of experiments.

Figure 1:
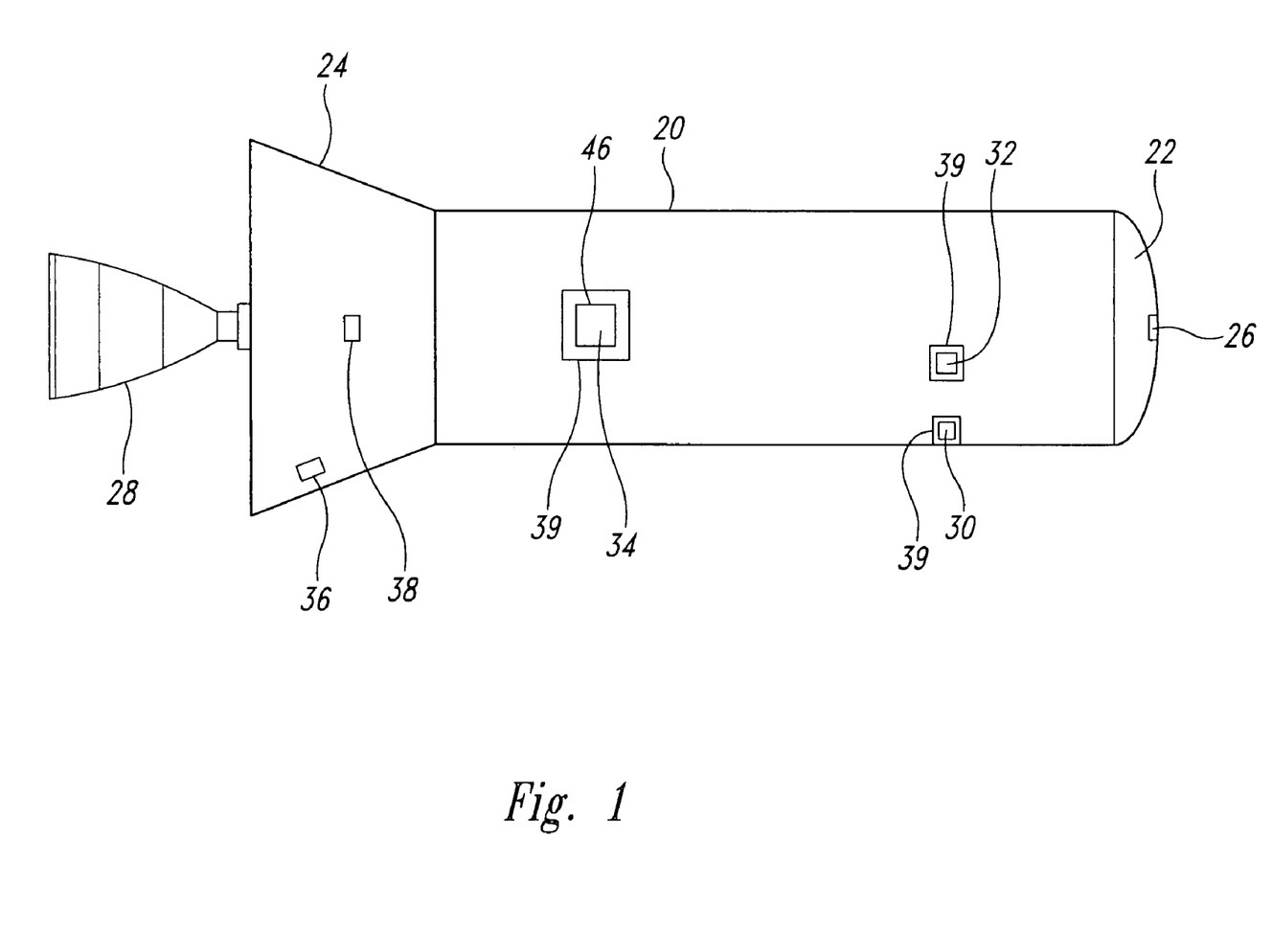
FIG. 1 is the exterior secondary payload hardware locations possible on a reusable launch vehicle (RLV).

Reference is now made to FIG. 1, which illustrates an exemplary embodiment of the invention. FIG. 1 is a side view of exterior secondary payload hardware locations offering the full range of re-entry heating environments on reusable orbital vehicle (OV) 20, which may typically be the second stage of a two-stage launch vehicle. The initial booster stage, sometimes referred to as a launch assist platform (LAP), is shown diagrammatically as the LAP 58 in FIG. 7.

The OV 22 includes a number of suitable locations where external payloads may be attached. FIG. 1 illustrates six possible mounting locations for external payloads on the OV 22 ranging from a nose 22 location in a high heat area with surrounding thermal protection system tile to a less severe locations including one low heat aft skirt 24 location.

FIG. 1 illustrates an exterior nose experiment footprint 26 (identified as experiment number 1 footprint) at the forward end of the OV 22 at the opposite end from a launch vehicle engine 28. Exterior experiment number 2 footprint 30 and exterior experiment number 3 footprint 32 are approximately 12 feet aft of the nose 22 and use carrier plate 46 footprint experiment hardware. Details of the carrier plate 46 are provided below.

Exterior experiment number 4 footprint 34 is at midbody region of the OV 20 and also uses carrier plate 46 footprint experiment hardware. Exterior experiment number 5 footprint 36 is on aft skirt 24 location and includes a tile substitution experiment location. Exterior experiment number 6 footprint 38 uses carrier plate 46 footprint experiment hardware and is on aft flare skirt 24 location.

The experiments on the K-1 RLV are located in areas where additional TPS material is located to protect the K-1 RLV from damage if an experiment breaks or fails. At each of the external mounting locations, backup insulation, in the form of bordering blankets and an ablator, is bonded to the K-1 structure to maintain thermal integrity of the host vehicle (i.e., the OV 20). In addition to the use of additional thermal material to protect the OV 20, the experiment footprints may be conveniently located at hatchways, doors or access panels 39. If a customer experiment fails, damage would be limited to the access panel 39. The access panel 39 is removable and can thus be readily replaced if damaged.

The mounting footprints described above experience a range of different heat loads. For the high heat exposure, experiments can be mounted at experiment number 1 footprint 26 and experiment number 5 footprint 36. The experimenter will either bond their tile onto the carrier plate 46, which is then mechanically fastened to the K-1. Alternatively, the carrier plate can be bonded directly to the OV 20.

Figure 2:
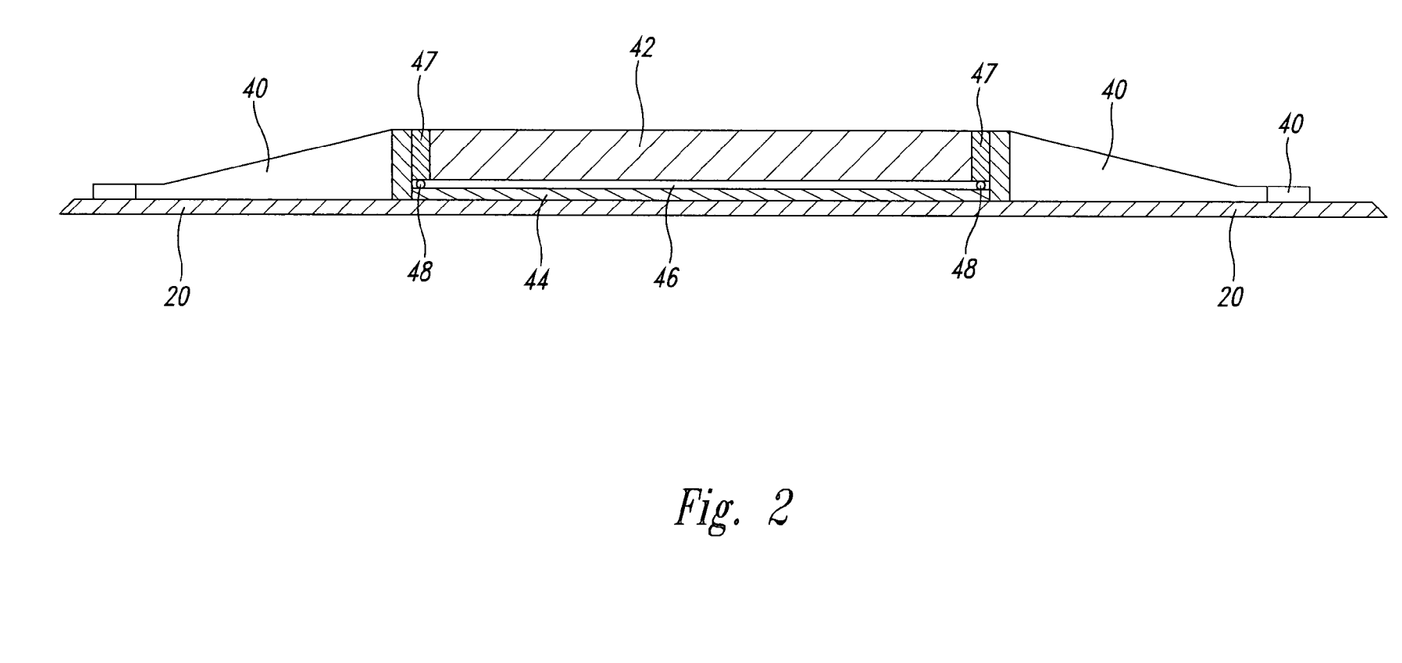
FIG. 2 is a fragmentary cross-section of the RLV of FIG. 1 and an external payload illustrating an example mounting of a standard exterior secondary payload hardware system.

The footprint of each experiment depends on the mounting location and the specific reusable launch vehicle. To provide the necessary thermal protection, the height of each experiment is generally limited to the TPS Outer Mold Line (OML), which is approximately 2.0 inches. The OML outline is shown in FIG. 2 by the cross-section of the TPS 40 of the OV 20.

For safety reasons, the RLV has certain limitations, such as no experiments at the experiment number 1 footprint can exceed the local TPS thickness. The experiment thickness can possibly exceed the OML by more than 2 inches at experiment number 2-6 footprints 30-38, but will require additional aerodynamic analysis and verification. The OV 22 can provide data recording to sensors mounted on or around the experiment, such as thermocouples and strain gauges, using its existing DFI system and passing insulated wire through the vehicle structure, ablator, and carrier plate. The DFI system monitors numerous parameters of the LAP 58 and the OV 20 using conventional technology. Data related to the operation of the OV 20 is made available on a standard 1553B data bus. The various experiments can make use of this system data by monitoring the 1553B data bus. As will be described in greater detail below, operational parameters that may be related to an experiment may be monitored and stored for further analysis by a customer/owner of the experiment. Details of the DFI system are also provided below.

Using the K-1 RLV as an example, the footprint for each experiment depends on the specific mounting location. Table 1 below provides example sizes for the experimental footprints 1-6.

TABLE 1

Passive Experiment Footprint Dimensions

| Footprint # | Location | Type | A (in.) | B (in.) |
|---|---|---|---|---|
| 1 | Nosecap | Tile Substitution | 9.00 × 9.00 | 9.16 × 9.16 |
| 2 | Payload Module | Carrier Plate | 7.50 × 4.25 | 10.50 × 7.25 |
| 3 | Payload Module | Carrier Plate | 7.50 × 4.25 | 10.50 × 7.25 |
| 4 | Mid Body | Carrier Plate | 24.00 × 24.00 | 27.00 × 27.00 |
| 5 | Aft Flare | Tile Substitution | 9.00 × 9.00 | 9.16 × 9.16 |
| 6 | Aft Flare | Carrier Plate | 6.00 × 14.00 | 9.00 × 17.00 |

In addition, the experiments must meet certain mass limitations, which are also dependent on the specific RLV and the specific mounting location. Again, using the K-1 RLV as the example, Table 2 provides maximum mass values (in pound-mass units) for each of the exterior experiment footprints 1-6:

TABLE 2

Passive Experiment Maximum Mass

| Footprint # | Mass (lbm) |
|---|---|
| 1 | 12.0 |
| 2 | 5.0 |
| 3 | 5.0 |

TABLE 2-continued

Passive Experiment Maximum Mass

| Footprint # | Mass (lbm) |
|---|---|
| 4 | 20.0 |
| 5 | 12.0 |
| 6 | 12.0 |

FIG. 2 is a cross section depicting an example of a customer thermal protection system (TPS) experiment 42 and thermal protection system 40 on the OV 20 with an example of carrier plate 46 experiment. The carrier plate 46 provides an optional mounting method for the customer's TPS experiment 42. The carrier plate is provided to the customer and the customer's TPS experiment 42 is bonded to the carrier plate 46. Thus, the customer has the responsibility of adequately bonding the customer's TPS experiment 42 to the carrier plate 46. The carrier plate 46 has mounting holes 48, which may be best seen in FIG. 3, to permit mounting of the carrier plate 46 to the OV 20. Thus, the carrier plate 46, with the customer TPS experiment 42 mounted by the customer, is bolted to the OV 20 at one of the attachment locations (i.e., the exterior experiment footprint numbers 1-6). For added protection, an ablator bonding layer 44 may be inserted beneath the carrier plate 46 to provide additional protection of the OV 20 in the event of a failure of the customer's TPS experiment 42. The space surrounding the customer's TPS experiment 42 and the TPS 40 on the OV 20 is protected by a border blanket 47. Thus, the customer's TPS experiment 42 is bonded to the carrier plate 46 and surrounded by the thermal border blanket 47 such that no gaps are permitted that might adversely affect the customer's experiment. Those skilled in the art will appreciate that protection of the customer's TPS experiment 42 also serves to provide additional thermal protection for the OV 20.

Figure 3:
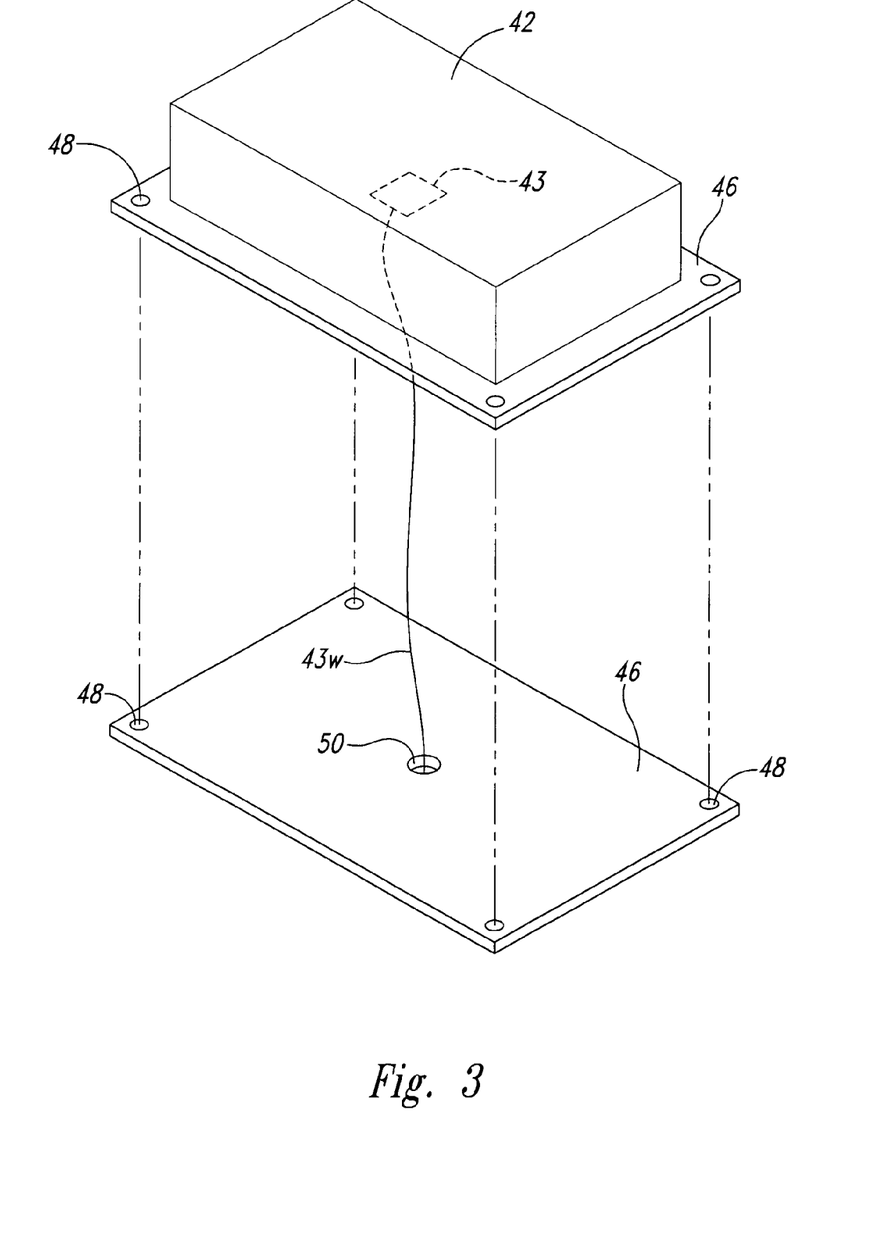
FIG. 3 illustrates an example of exterior secondary payload hardware attachment.

FIG. 3 depicts the customer TPS experiment 42 ablator bonded to carrier plate 46 with multiple bolt holes 48 positioned around the peripheral edge of the carrier plate plus an instrumentation wire pass-thru hole 50. The carrier plate 46 illustrated in FIG. 3 may be suitable for mounting in attachment positions such as the exterior experiment number 2 footprint 30 and the exterior experiment number 3 footprint 32. Those skilled in the art will recognize that the shape of the carrier plate 46 and the position of the bolt holes 48 will vary depending on the footprint outline (see Table 1 above). However, the arrangement of FIG. 3 illustrates the use of the carrier plate 46 to receive the customer's TPS experiment 42 and the arrangement for attaching the carrier plate 46 to the OV 20.

Sensors 43, such as pressure transducers, strain gauges, thermocouples and the like may be part of the experiment 42. The sensor 43 has sensor wires 43w which are routed through the pass-thru hole 50 for connection to electronics, such as a data recorder, within the OV 20. As will be described in greater detail below, an experiment management unit (EMU) 100 (see FIG. 8) has data processing capabilities to monitor and record data from the experiment 42. Connections between the data sensors and the EMU 100 are provided by the sensor wires 43w via the pass-thru hole 50.

Figure 4:
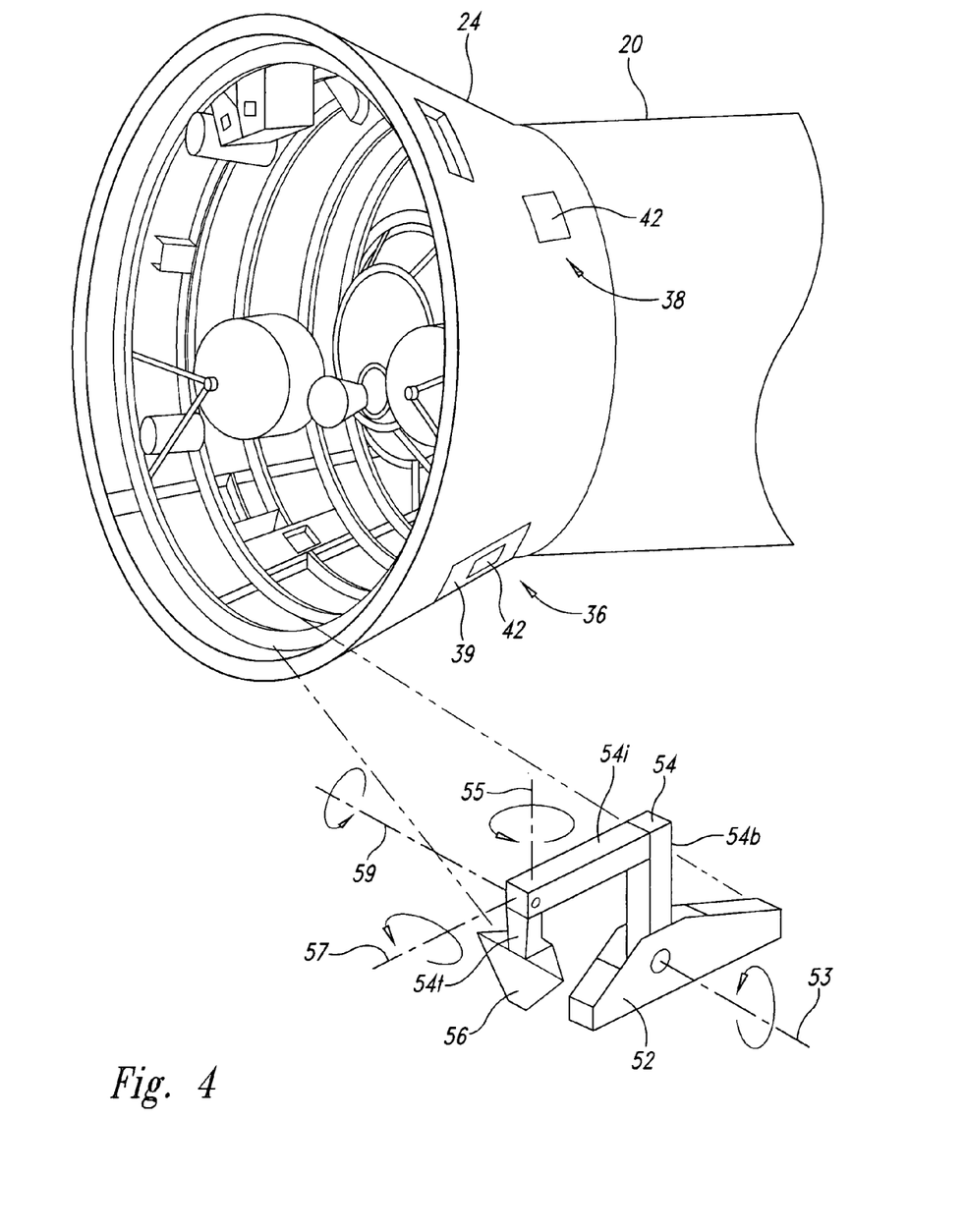
FIG. 4 is the aft skirt launch vehicle location for the exterior secondary payload hardware deployed while in flight.

FIG. 4 depicts the OV 20 with aft flare skirt 24 region containing exterior experiment number 5 footprint 36 and exterior experiment number 6 footprint 38. Exterior experiment number 5 footprint 36 located on a lower region of the aft flare skirt 24 bottom and is thus in a high heat region on the bottom of the OV 20. Due to the high temperatures expected in the attachment area of the exterior experiment number 5 footprint 36, the customer's TPS experiment 42 may be directly bonded to the TPS 40 of the aft flare skirt 24. In applications in this region, the carrier plate 46 (see FIG. 3) may be eliminated. Border blanket 47 with through holes (see FIG. 2) can be used around tile substitution customer's TPS experiment 42 to provide additional thermal protection for the OV 20. Further up on the side of the OV 20 aft flare skirt 24 is a lower heat area and the location of exterior experiment number 6 footprint 38. A lower expected temperature range associated with the exterior experiment number 6 footprint 38 permits the use of the carrier plate 46 for ease in mounting the customer's TPS experiment 42. The carrier plate arrangement, such as illustrated in FIG. 3, may be readily adapted for use at the exterior experiment number 6 footprint 38.

Also located inside aft flare skirt 24 is an installable base unit 52 anchoring a deployment arm 54. The deployment arm 54 comprises a base portion 54b, an intermediate portion 54i and a terminal portion 54t. The deployment arm base portion 54b is moveably coupled to the base unit 52. The deployment arm base portion 54b can rotate on an axis of rotation 53 to permit the deployment arm terminal portion 54t to move into the slip stream surrounding the OV 20 as it moves in environments with some atmosphere at high speed. The deployment arm terminal portion 54t is moveably coupled to the deployment arm intermediate portion 54i and is capable of rotation in along three different and substantially orthogonal axes. As illustrated in FIG. 4, the deployment arm terminal portion 54t can rotate about an axis of rotation 55, an axis of rotation 57 and an axis of rotation 59.

The movement of the deployment arm 54 may be electrically controlled by motors, gears, pulleys and the like. Alternatively, the deployment arm 54 may be hydraulically controlled. The EMU 100 (see FIG. 8) provides the necessary signals to control movement of the deployment arm 54.

The deployment arm 54 is particularly useful for testing leading edges and control surfaces of space craft and the associated TPS used thereon. When the deployment arm 54 is activated and moved into the slipstream, the high speed creates friction and heat on leading edge TPS experiment 56 and acts through controllable rotation of the deployment arm 54 as a method of diverting the slip stream for purposes of steering reusable orbital vehicle 20. Those skilled in the art will appreciate that the term "leading edge" refers to the edge of a wing or other re-entering object. The leading edge encounters significant heating and is generally the most difficult area of a space craft to test under simulated conditions. The present invention advantageously provides a technique for testing leading edge experiments under actual operating conditions. The leading edge TPS experiment 56 my be bolted or pinned to the deployment arm terminal portion 54t. Alternatively, the leading edge TPS experiment 56 may be slipped on in a shoe arrangement. In yet another alternative embodiment, the leading edge TPS experiment 56 may be coupled to the deployment arm 54 all the way back inside the aft flare skirt 24 so that the actual connection is inside the protected volume and not in the slipstream itself.

The leading edge TPS experiment 56 may be used to test steering elements of a space craft. Steering elements, such as ailerons on a wing or tail rudder steering elements, which are used to steer a re-entering space craft may be tested as the leading edge TPS experiment 56. In yet another alternative embodiment, the leading edge TPS experiment 56 may be used as a steering element itself. Some theorists have suggested that a single "foot" dangling behind a re-entering space vehicle in the slipstream can be mechanically turned to function like a canoe paddle and thus divert the vehicle back and forth to permit the "S" turns used by the space shuttle to dissipate the energy of reentry. The leading edge TPS experiment 56 may be repositioned using the mechanical, electrical or hydraulic steering subsystem to demonstrate the efficacy of a single dangling foot used to control S turns.

Such an approach to experimental design points out another advantage of the reusable system of the present invention. A space craft designer can test the testing steering elements on a craft, such as the OV 20 for several million dollars rather than risking several billion dollars on a new vehicle with no prior testing of such steering elements. Utilization of the deployment arm 54 on the OV 20 allows testing under actual conditions prior to the commitment of billions of dollars to the development of a new craft.

Those skilled in the art will appreciate that use of the leading edge TPS experiment 56 may alter the steering of the OV 20 in actual operation. Accordingly, the experimental protocol must take into account the effects of the experiment on the actual operation of the OV 20. Furthermore, the OV 20 may use the steering element for non-experimental purposes to control re-entry, as described above.

Figure 5:
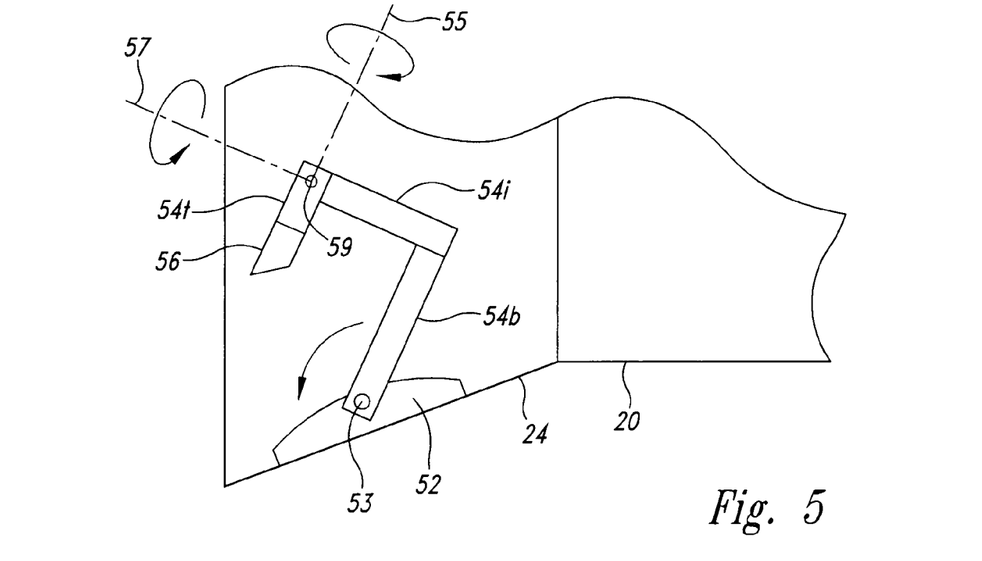
FIG. 5 illustrates the secondary aft skirt payload hardware of FIG. 4 in a retracted condition.

FIG. 5 depicts aft flare skirt 24 region with one retracted position for deployment unit 52 with one retracted position for deployment arm 54 capable of rotating into the slip stream surrounding the OV 20 as it moves in environments with some atmosphere at high speed. This high speed creates friction and heat on leading edge TPS experiment 56 for testing and other purposes.

Figure 6:
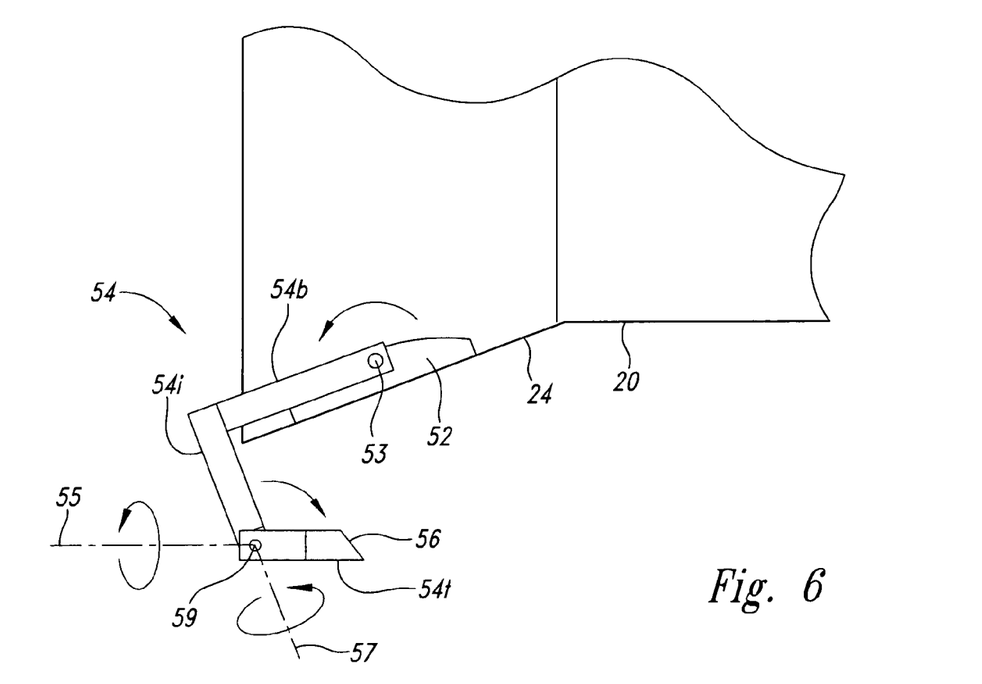
FIG. 6 illustrates the secondary aft skirt payload hardware of FIG. 4 in a deployed condition.

FIG. 6 depicts aft flare skirt 24 region for deployment unit 52 with one deployed position for deployment arm 54 capable of rotating into the slip stream surrounding the OV 20 as it moves in environments with some atmosphere at high speed. This high speed creates friction and heat on leading edge TPS experiment 56 for testing and other purposes. Ground level after landing 92 is far enough to allow protecting of leading edge TPS experiment 56 for testing and reuse purposes.

Figure 7:
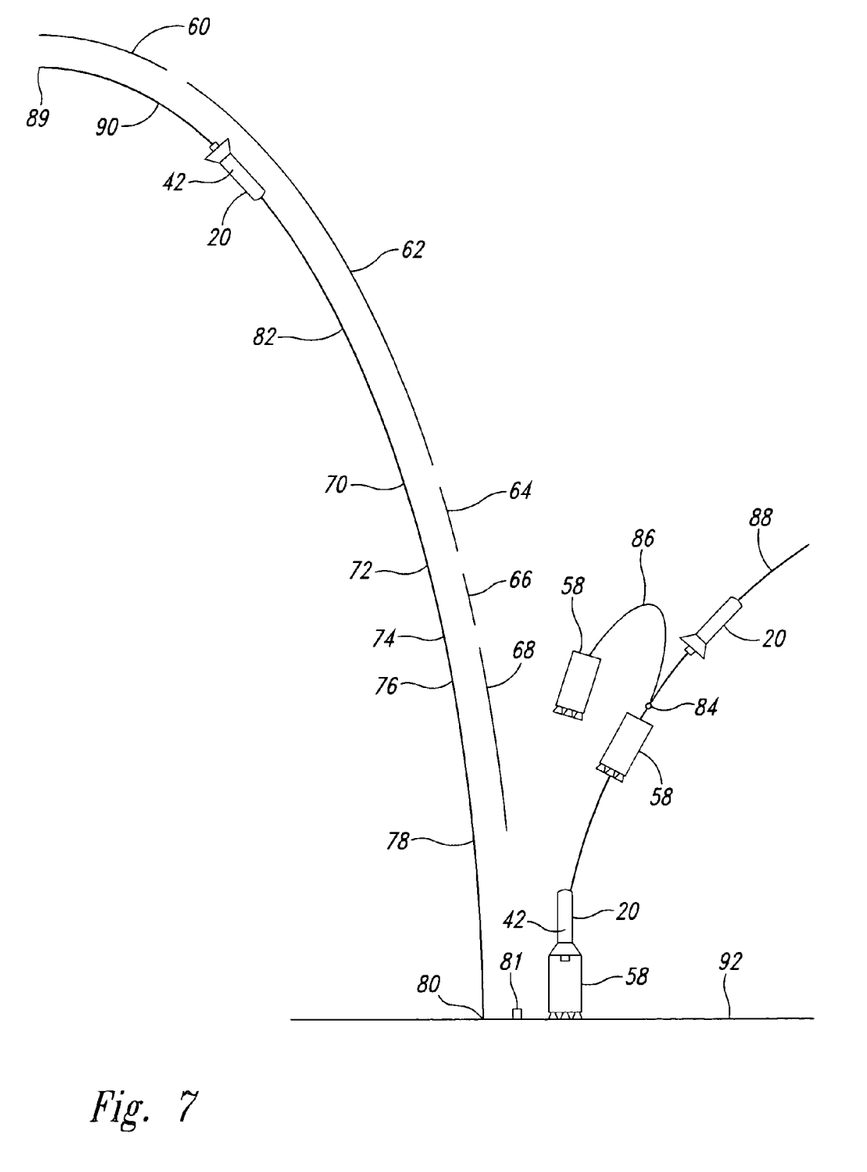
FIG. 7 illustrates the exterior secondary payload environment during a flight of the RLV of FIG. 1.

FIG. 7 depicts the OV 20 launch and re-entry environments from launch to reuse. The OV 20 launches with the assistance of launch assist platform 58 and is part of a complete transportation cycle from launch site landing 80 with experiment recovery 81 to next launch site landing 80 at ground level after landing 92.

Carrier plate type customer's TPS experiment 42 and/or tile substitution type customer's TPS experiment 42 are attached to the OV 20 and carried with the LAP 58 from near landing area 80 upwards toward orbit. As the OV 20 moves along an ascent trajectory 88, it experiences some heating and some re-entry heating and other environments after stage separation 84 at approximately Mach 4.4 at approximately 135,000 feet altitude.

Stage separation occurs at a point 84 along an ascent trajectory 88. At stage separation 84, the OV 20 separates from the LAP 58. Following stage separation 84, the LAP 58 changes direction 180 degrees. The center engine on the LAP 58 relights and propels the nearly empty 1st stage back toward landing 80 area for recovery and reuse. The LAP 58 experiences some re-entry heating and some other environments on LAP re-entry phase 86 moving toward landing 80 area.

Following stage separation 84, the OV 20 continues on the ascent OV trajectory 88 into orbit and experiences some additional ascent heating and other environments. The OV 20 reaches orbit, delivers payload and orbits for approximately 22 hours for the earth to spin under it and position the OV 20 for re-entry OV trajectory 82.

Those skilled in the art will appreciate that the OV 20 may carry a number of payloads into orbit. These payloads may include the exterior experiments attached to the OV 20 at the exterior attachment locations (i.e., the exterior experiment footprint numbers 1-6 or attached to the deployment arm 54), experiments contained within the interior of the OV 20 and satellites carried aboard the OV to be dispensed in orbit. The interior experiments are discussed in co-pending U.S. Patent Application Number (not yet assigned, Express Mail No. ER495032228), entitled COMMERCIAL EXPERIMENT SYSTEM IN ORBIT, filed on Oct. 9, 2003, which is assigned to the assignee of the present invention and which is incorporated herein in its entirety. The use of an active satellite dispenser to insert one or more satellites into orbit is discussed, for example, in co-pending U.S. patent application Ser. No. 10/132,083, entitled ACTIVE SATELLITE DISPENSER FOR REUSEABLE LAUNCH VEHICLE, filed on Apr. 23, 2002, which is assigned to the assignee of the present invention and which is incorporated herein in its entirety.

Moving along re-entry OV trajectory 82, the OV 20 continues to entry interface 89 and starts pre-entry phase 60 with open loop bank command at approximately 400,000 feet or 76 miles above the earth. The OV 20 continues to entry phase 62 with 0.1 gravity encountered at a point 90 along the re-entry OV trajectory 82. After continuing along re-entry OV trajectory 82, the OV 20 initiates bank reversal 70 and enters a bank reversal phase 64. The bank reversal phase 64 refers to a process in which the re-entering OV 20 performs a series of gentle S turns, such as used by the shuttle, to dissipate energy and to slow down. The wide gentle banking in alternating directions (i.e., S turns) allows the OV to dissipate a significant amount of the energy of re-entry and to reduce speed. At the end of the bank reversal 72, the OV 20 continues to terminal phase 66 of along the re-entry OV trajectory 82.

Moving along re-entry OV trajectory 82, the OV 20 deploys a stabilization chute at a point 74. This starts chute phase 68 and stabilization chute deployed 74, drogue chute deployed 76 and finally main chute deployed 78. This chute phase 68 sequence starts approximately 70,000 feet above the surface.

The OV 20 continues under parachute to launch site landing 80. Customer's TPS experiment 42 is part of the OV 20 processing for reuse, which includes experiment recovery 81. Data from sensors 43 is stored on-board the OV 20 and is recovered and returned to the customer for analysis.

Figure 8:
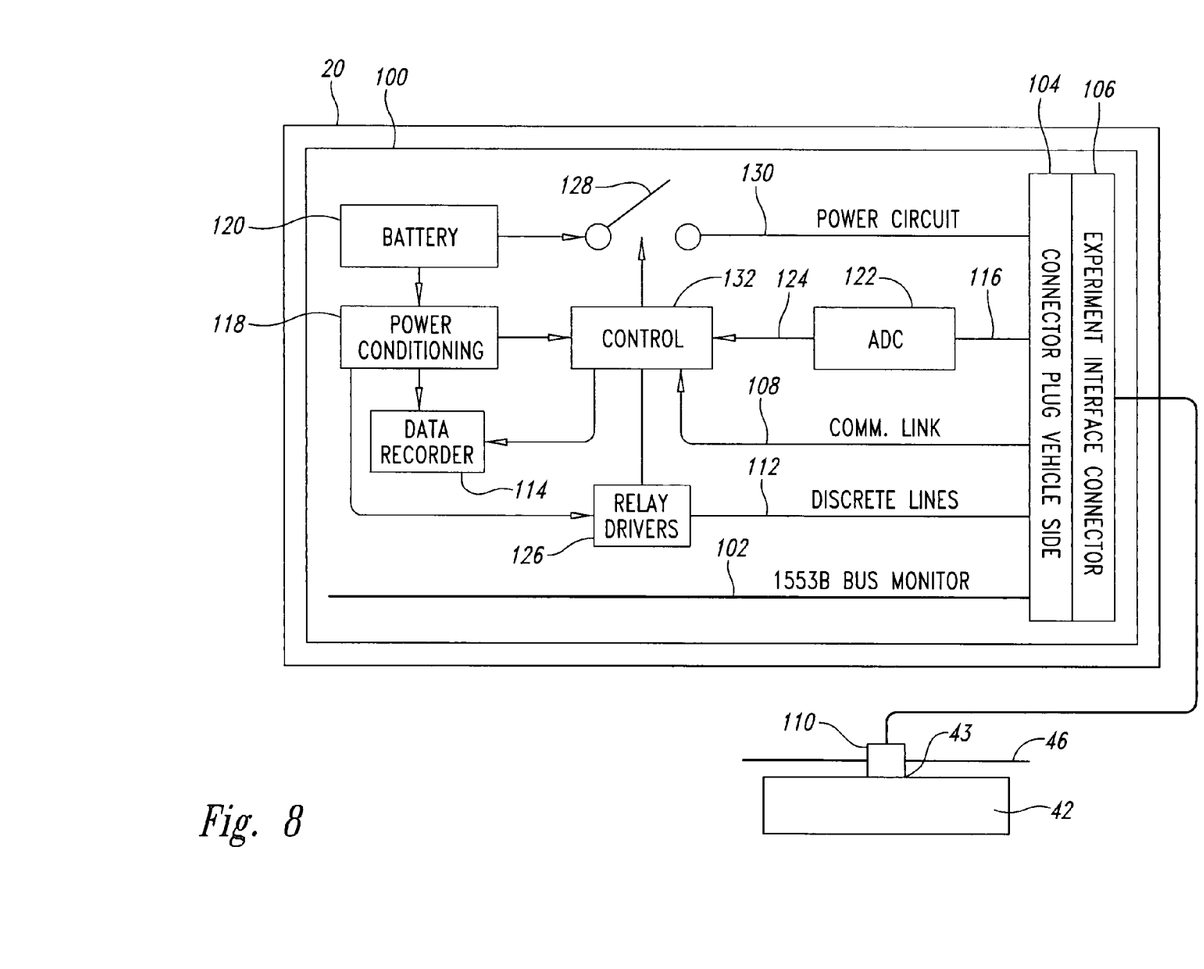
FIG. 8 is a functional block diagram of an experiment management unit to control experiments and record data.

The OV 20 contains an Experiment Management Unit (EMU) 100, which provides each experiment with power, if necessary, data recording for analog sensors, digital data recording, if required, for example through an RS-422 interface, TTL-compatible digital discrete control lines, and access to the K-11553B avionics databus in a shadow or monitor mode.

FIG. 8 depicts the EMU 100 attached to OV 20. The EMU 100 serves as the interface between various experiments (i.e., the customer's TPS experiment 42 of FIG. 3) and the OV 20 support services available from the OV 20 including power, communications, the 1553B data bus, control and other services including transportation.

Actual avionics flight data from the OV 20 is available via the 1553B data bus monitoring 102 through the connection of a multi-pin vehicle side electrical connector 104 to a mating tray side connector 106 for the actual flight of the experiment (i.e., the customer's TPS experiment 42).

Communications data from the OV 20 is available via an RS-422 communications link 108 through the connection of the vehicle side connector 104 coupled to the sensor wires 43w via an experiment connector 110 for the actual flight of the experiment.

Discrete communications data or separate status information from the OV 20 is available via discrete commands in 5 standard wires 112 through the vehicle side connector 104 to the experiment connector 110 for the actual flight of the experiment.

Data recording to and from OV 20 is available via data recorder 114 through analog in 8 standard wires 116 via the vehicle side connector 104 to the experiment connector 110 for the actual flight of the experiment.

Power from the OV 20 is available via power conditioning 118 from an experiment battery 120 in the EMU 100. The experiment connector 110 on the EMU 100 is shown with experiment support structure, such as the carrier plate 46 for the actual flight of the experiment on the OV 20. A power inhibit circuit 128 further provides control to turn power on and off in 28 volt 2 standard wire power circuit 130.

The EMU 100 may include conventional components such as an analog to digital converter (ADC) 122 to provide digitized signals 124 to the data recorder 114, a digital to analog converter (not shown) and relay drivers 126 to control the discrete lines, and the like. The operation of these components is well known in the art and need not be described herein. The operation of the EMU 100 is controlled by a control system 132, to provide the necessary timing for experiments, power control, signal buffering data storage and the like. The control system 132 may be a microprocessor, digital signal processor, microcontroller, programmable gate array, discrete component circuit or the like.

Well in advance of launch, Kistler K-1 staff delivers each experimenter an Interface Kit containing the requisite number of experiment size and thickness details, fasteners, electrical connectors, and an EMU simulator to verify the electrical interfaces. The box contains a standard attachment method to mount experiments. Prior to launch, the experimenters deliver their experiments mounted on furnished hardware to Kistler; who in turn, installs the hardware onto the K-1 vehicle. Multiple experiments from different customers may be placed on the same vehicle, or experiments may be separated into different locations, depending on compatibility, temperature or due to other issues. After the flight, Kistler returns the experiments and data to the experimenters, and delivers a Post-Flight Report documenting flight parameters.

If required, processing areas, office space, and storage areas at the launch site for the experimenter are available to support pre-launch checkout and testing. Selected operating parameters for the OV 20 may be used to assist in designing the customer experiments. Some of these parameters are provided below. Other parameters have already been discussed or are within the design skills of a person of ordinary skill in the art utilizing the disclosure contained herein.

External Experiments

Kistler's approach to externally mounted experiments is to replace existing K-1 hardware (access panels, doors, tile, or blanket parts) with technology experiments on fail-safe test panels. Panels will be designed with backup insulation and structure to maintain thermal integrity in the event of an experiment failure. Data recording will be made available through the existing developmental flight instrumentation (DFI) system on the K-1 vehicle.

External Experiment Environments

Material experiments will be exposed to the ambient air at Kistler's launch site in Woomera, South Australia.

Thermal Environment

Heat loads during reentry drive the design of materials and TPS experiments externally mounted to the orbital vehicle OV vary with the specific vehicle used. The example K-1 vehicle has specific predicted heat environment at each identified mounting location on K-1 Orbital Vehicle locations as shown in table 3 below:

TABLE 3

Heating Environment in K-1 OV External Footprints

| Footprint # | Peak Heating Rate (BTU/ft$^2$/sec) | Integrated Heat Load (BTU/ft$^2$) | Radiation Eq. Temp. (F.) |
|---|---|---|---|
| 1 | 65.0 | 14,350 | 3,060 |
| 2 | 9.5 | 1,830 | 1,716 |
| 3 | 7.6 | 1,300 | 1,598 |
| 4 | 2.2 | 450 | 1,050 |
| 5 | 33.0 | 5,940 | 2,511 |
| 6 | 12.4 | 2,435 | 1,866 |

NOTE:
Radiation equilibrium temperatures assumes $\epsilon = 0.89$ and $\delta = 4.76\text{E}{-13}$ Acoustic Environment Acoustic loads during reentry drive the design of materials and TPS experiments externally mounted to the orbital vehicle OV vary with the specific vehicle used. The example K-1 maximum predicted noise is 148 to 160 overall sound pressure level (in dB) at each external mounting location depending on the location, including the phase of flight the maximum environment occurs. If Kistler and the experimenter determine acoustic testing is required, Kistler will provide sound pressure spectrums for verification testing.

Design Limit Load Factors

An example K-1 design limit load factor of 35 g encompasses both predicted static and dynamic loads for externally mounted TPS experiments. This load factor applies to each axis (one at a time).

Subsystem Replacement Experiments

Reusable launch vehicles can substitute a test subsystem for an existing subsystem on the vehicle. An expendable launch vehicle can also substitute a test subsystem for an existing working subsystem, but the test subsystem never comes back for testing and evaluation. Each type of vehicle could also substitute a test subsystem and have a back up working subsystem to take over, if the test subsystem fails. The expendable vehicle would return only one half of the trips test data and no test system for testing and evaluation on the ground. The reusable launch vehicle can provide the full trip cycle of test data. The final category of experiment open to experimenters is replacement of an existing K-1 subsystem with one utilizing advanced technology. As an example of this options is the Space Launch Initiative (SLI) experiments on the K-1 vehicle. Existing interfaces will be maintained between the experiment and the vehicle. Examples of this type of experiment on the example K-1 vehicle include:

Replacement of a K-1 TPS material and joint details with another;

Replacement of one or more of the K-1's main engines with upgraded engine(s) utilizing advanced materials, mechanical subsystems, and IVHM;

Replacement of one of the K-1's batteries with higher energy density storage devices;

Replacement of one of the K-1's structural elements, such as propellant tanks, with elements utilizing advanced materials.

K-1 Development Flight Instrumentation (DFI) System

Data recording for an example K-1 vehicle is available to all categories of Space Launch Initiative (SLI) experiments (externally mounted, internally mounted, and subsystem replacement) through the K-1's existing DFI system. The DFI system was designed to provide a modular, tailorable system for measurement of data required for final verification of the K-1 RLV. Approximately 270 parameters will be measured using the system on the first four K-1 flights. Data measurement instruments in the basic DFI system include thermocouples, strain gauges, accelerometers, pressure transducers, temperature gas probes, Resistance Temperature Devices (RTDs), and microphones.

The example Kistler K-1 can leave all or part of the Development Flight Instrumentation (DFI) system in the K-1 vehicle to support NASA and other customer Add-on Technology Experiment flights, and can reconfigure and expand the DFI system over 50% to meet mission needs. The Kistler K-1 baseline DFI system is a distributed data acquisition system with data nodes located in all launch assist platform (LAP) and orbiter vehicle (OV) compartments. There are four OV nodes. Each node is capable of supporting up to 31 channels of analog/digital signal processing. The number of measurements that a channel can handle is dependent upon the type of signal being processed. For example:

A thermocouple channel (card) can process 8 thermocouples

An accelerometer channel (card) can process 2 accelerometers

A bridge circuit channel (card) can process 4 bridge circuits. Each node is capable of streaming 10 Mbps. The baseline DFI system does not send DFI data to the ground. Real time data is collected and recorded in a solid-state recorder [one each on the launch assist platform (LAP) and orbiter vehicle (OV) stages]. Each recorder is capable of recording four 10 Mbps channels.

Data from the DFI system is available for use in customer experiments using the 1553B data bus in monitoring only mode. For example, the EMU 100 may monitor data to determine flight status information. This flight status information can be stored in the data recorder 114 in association with data from the sensors 43. Upon completion of the mission, the experiment owner may use the data for analysis of the experiment. The DFI system data may also be used by the EMU 100 to trigger certain events. For example, an experiment involving the deployment arm 54 may require deployment of the deployment arm at a certain phase of the mission (e.g., the re-entry phase 62 in FIG. 7). The EMU 100 monitors the 1553B data bus to determine the start of the re-entry phase 62 and triggers the activity of the deployment arm 54.

Experiment Integration Facilities

Integration facilities required by experiment support crews vary on a case-by-case basis on other reusable launch vehicles. As a baseline approach, the example Kistler K-1 will set aside space in its vehicle processing facility (VPF) for use by the experiment's support crew as required. Kistler's K-1 example approach to SLI experiments is to integrate them as part of the normal maintenance and refurbishment process of the K-1 stages.

Therefore, placing the experimenter's support facilities in the Vehicle Processing Facility (VPF) will facilitate experiment integration into the K-1, which is refurbished and maintained in the same room. If required, Kistler can segregate the experimenter's area within the VPF, or provide a separate facility outside the VPF for use by experimenters. If clean facilities are required, Kistler can also provide the experiment support crew with a payload station in its PPF. The availability of the payload station is subject to coordination with Kistler's payload customers. The Payload Processing Facility (PPF) is designed to support satellite processing, test, and integration. The PPF includes two highbay payload processing work areas, two processing control rooms, a highbay payload module processing and hazardous operations area, a master airlock, a support equipment storage area, and the necessary office and personnel facilities. The Kistler Mission Control Center is also located in the PPF. Processing areas in the PPF are Class 100,000 clean facilities. Ultimately, experiments in the clean facility must be moved into the VPF for integration into the K-1.

Other objects, advantages and novel features, and further scope of applicability will be set forth in part in the detailed description to follow including drawings taken in conjunction with the accompanying drawings FIG. 1 through FIG. 7, and in part will become apparent to those skilled in the art upon examination of the following, or may be learned by practice of the invention. The objects and advantages of the invention may be realized and attained by means of the new testing opportunities process instrumentation and combinations particularly pointed out in the appended claims.

Although the invention has been described in detail with particular reference to these preferred embodiments, other embodiments can achieve the same results. Variations and modifications of the present invention will be obvious to those skilled in the art and it is intended to cover all such modifications and equivalents.

INDUSTRIAL APPLICABILITY

The invention is further illustrated by the following non-limiting examples.

EXAMPLE 1

Passive Experiment Mounting Footprints

Six footprints are available to mount Passive Experiments on the outside of the K-1 Orbital Vehicle (OV). These footprints are attached to the exterior of the vehicle. Kistler's approach for passive experiments is to replace existing K-1 hardware (access panels, doors, tile, or blanket parts) with experiments mounted on Carrier Plates or bonded directly to the K-1 structure.

EXAMPLE 2

Passive Stowage with Active Re-Entry Environment Exposure

Commercial service includes the stowage of an experiment in the aft flare volume of the launch vehicle out of the re-entry slip stream and the ability to introduce the movable arm tip upon command or other control into the re-entry slip stream during the re-entry phase of the re-entry trajectory.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system for introducing payloads into earth orbit, comprising:

a reusable orbital vehicle capable of being placed in earth orbit, the orbital vehicle having an elongated shape with first and second ends with a rocket engine positioned proximate the orbital vehicle second end;

an aft skirt proximate the orbital vehicle second end;

an attachment member rotatably mounted to an interior portion of the aft skirt; and an external payload package coupled to the attachment member for rotation therewith, the attachment member being configured to rotate and thereby position the payload package outside of the interior portion of the aft skirt.

2. The system of claim 1, further comprising a mounting bracket fixedly mounted to the interior portion of the aft skirt wherein the attachment member is moveably coupled to the mounting bracket.

3. The system of claim 2, further comprising a control system to control movement of the attachment member to move the attachment member and thereby position an external payload package outside an interior portion of the aft skirt.

4. The system of claim 1 wherein the attachment member comprises a base portion having first and second ends, the base portion first end being coupled to the interior portion of the aft skirt, an intermediate portion having first and second ends, the intermediate portion first end being coupled to the coupled to the base portion second end, and a terminal portion having first and second ends, the terminal portion first end being coupled to the coupled to the intermediate portion second end.

5. The system of claim 4, further comprising a mounting bracket fixedly mounted to the interior portion of the aft skirt wherein the base portion first end is rotatably coupled to the mounting bracket.

6. The system of claim 4 wherein the terminal portion first end is rotatably coupled to the intermediate portion second end.

7. The system of claim 4, further comprising a mounting member coupled to the terminal portion second end and configured to receive the second experimental package.

8. A system for introducing payloads into earth orbit, comprising:

a reusable orbital vehicle capable of being placed in earth orbit, the orbital vehicle an elongated body portion with first and second ends with a rocket engine positioned proximate the second end of the orbital vehicle;

an aft skirt coupled to the body portion proximate the second end and extending circumferentially around the rocket engine; and a rotatably mounted attachment member mounted to an interior portion of the aft skirt, the attachment member configured to receive an experiment and to rotate to thereby position the experiment outside of the interior portion of the aft skirt.

9. The system of claim 8 wherein the attachment member is moveably mounted to the interior portion of the aft skirt, the system further comprising a control system to control movement of the attachment member to move the attachment member and thereby position the experiment outside the interior portion of the aft skirt.

10. The system of claim 9 wherein the experiment is an experimental control surface.

11. The system of claim 10 wherein the control system provides steering control of the attachment member to thereby steer the experiment while positioned outside the interior portion of the aft skirt.

12. The system of claim 8 wherein the attachment member comprises a base portion having first and second ends, the base portion first end being coupled to the interior portion of the aft skirt, an intermediate portion having first and second ends, the intermediate portion first end being coupled to the coupled to the base portion second end, and a terminal portion having first and second ends, the terminal portion first end being coupled to the coupled to the intermediate portion second end.

13. The system of claim 12, further comprising a mounting bracket fixedly mounted to the interior portion of the aft skirt wherein the base portion first end is moveably coupled to the mounting bracket.

14. The system of claim 12 wherein the terminal portion first end is moveably coupled to the intermediate portion second end.

15. The system of claim 12, further comprising a mounting member coupled to the terminal portion second end and configured to receive the experiment.

16. The system of claim 8, further comprising a sensor associated with the experiment, the sensor generating sensor data and a data storage unit to receive and store the generated sensor data.

* * * * *